(12) United States Patent
Kuriki et al.

(10) Patent No.: US 8,755,169 B2
(45) Date of Patent: Jun. 17, 2014

(54) ELECTROCHEMICAL CAPACITOR

(75) Inventors: Kazutaka Kuriki, Kanagawa (JP);
Kiyofumi Ogino, Kanagawa (JP);
Yumiko Saito, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 240 days.

(21) Appl. No.: 12/891,321

(22) Filed: Sep. 27, 2010

(65) Prior Publication Data
US 2011/0075322 A1 Mar. 31, 2011

(30) Foreign Application Priority Data
Sep. 30, 2009 (JP) ................. 2009-227004

(51) Int. Cl.
*H01G 9/00* (2006.01)
*H01G 9/02* (2006.01)

(52) U.S. Cl.
USPC .................... 361/502; 252/62.2

(58) Field of Classification Search
USPC ................. 361/502, 503; 252/62.2
See application file for complete search history.

(56) References Cited

U.S. PATENT DOCUMENTS

| | | | | |
|---|---|---|---|---|
| 3,652,902 | A * | 3/1972 | Hart et al. | 361/502 |
| 5,909,356 | A * | 6/1999 | Hirabayashi et al. | 361/523 |
| 6,094,338 | A * | 7/2000 | Hirahara et al. | 361/502 |
| 6,294,274 | B1 | 9/2001 | Kawazoe | |
| 7,147,971 | B2 | 12/2006 | Okamoto et al. | |
| 7,235,330 | B1 | 6/2007 | Fujimoto et al. | |
| 7,432,010 | B2 | 10/2008 | Dokko | |
| 7,521,151 | B2 | 4/2009 | Hwang et al. | |
| 7,592,099 | B2 | 9/2009 | Tamura et al. | |
| 7,670,508 | B2 | 3/2010 | Hara et al. | |
| RE42,273 | E * | 4/2011 | Nathan et al. | 429/236 |
| 8,264,818 | B2 * | 9/2012 | Tamachi et al. | 361/502 |
| 2002/0122985 | A1 | 9/2002 | Sato et al. | |

(Continued)

FOREIGN PATENT DOCUMENTS

| | | |
|---|---|---|
| DE | 10201267 C1 * | 4/2003 |
| EP | 1 956 618 A1 | 8/2008 |

(Continued)

OTHER PUBLICATIONS

Yoichiro Hata, "Development of Integrated Manufacturing System for 50-μM-Thick All-Solid-State Lithium-Ion Battery"; EETimes Japan; Jan. 21, 2009; http://eetimes.jp/article/22693/ (with full English translation.

(Continued)

*Primary Examiner* — Eric Thomas
(74) *Attorney, Agent, or Firm* — Fish & Richardson P.C.

(57) ABSTRACT

An electrochemical capacitor capable of increasing a capacity is proposed. The electrochemical capacitor is a positive electrode and a negative electrode formed over a surface plane of a substrate. Additionally, the electrochemical capacitor has an electrolyte, and the positive electrode and the negative electrode are in contact with a same surface plane of the electrolyte. In other words, the electrochemical capacitor has a positive electrode active material and a negative electrode active material over a surface plane of an electrolyte, a positive electrode current collector which is in contact with the positive electrode active material, and a negative electrode current collector which is in contact with the negative electrode active material. By the aforesaid structure, a capacity of the electrochemical capacitor can be increased.

18 Claims, 7 Drawing Sheets

(56) References Cited

U.S. PATENT DOCUMENTS

| | | | |
|---|---|---|---|
| 2003/0068550 A1 | 4/2003 | Naoi et al. | |
| 2006/0099474 A1 | 5/2006 | Hara et al. | |
| 2006/0274480 A1* | 12/2006 | Kosuda et al. | 361/502 |
| 2007/0048619 A1 | 3/2007 | Inda | |
| 2007/0059584 A1 | 3/2007 | Nakano et al. | |
| 2007/0087269 A1 | 4/2007 | Inda | |
| 2007/0109723 A1* | 5/2007 | Kuriyama et al. | 361/502 |
| 2008/0106191 A1 | 5/2008 | Kawase | |
| 2008/0203454 A1 | 8/2008 | Asami | |
| 2008/0273290 A1* | 11/2008 | Dementiev et al. | 361/502 |
| 2008/0297981 A1 | 12/2008 | Endo et al. | |
| 2009/0021891 A1* | 1/2009 | Higashi et al. | 361/502 |
| 2009/0098438 A1 | 4/2009 | Kunitake et al. | |
| 2009/0130499 A1* | 5/2009 | Honda et al. | 429/13 |
| 2010/0092800 A1 | 4/2010 | Itagaki | |
| 2010/0239907 A1 | 9/2010 | Izumi | |
| 2011/0073991 A1 | 3/2011 | Kuriki et al. | |

FOREIGN PATENT DOCUMENTS

| | | | |
|---|---|---|---|
| EP | 2 009 722 A1 | | 12/2008 |
| JP | 61-163570 A | | 7/1986 |
| JP | 63-158761 A | | 7/1988 |
| JP | 63-210022 A | | 8/1988 |
| JP | 63-210023 A | | 8/1988 |
| JP | 63-210024 A | | 8/1988 |
| JP | 63-215519 A | | 9/1988 |
| JP | 63-239117 A | | 10/1988 |
| JP | 63-265818 A | | 11/1988 |
| JP | 01-260765 A | | 10/1989 |
| JP | 05347233 A | * | 12/1993 |
| JP | 2000294454 A | * | 10/2000 |
| JP | 2002-289174 A | | 10/2002 |
| JP | 2003-109875 A | | 4/2003 |
| JP | 2004-158222 A | | 6/2004 |
| JP | 2005-174617 A | | 6/2005 |
| JP | 2006-185913 A | | 7/2006 |
| JP | 2006-245188 A | | 9/2006 |
| JP | 2007005718 A | * | 1/2007 |
| JP | 2007-123833 A | | 5/2007 |
| JP | 2007-134305 A | | 5/2007 |
| JP | 2007-299580 A | | 11/2007 |
| JP | 2008066681 A | * | 3/2008 |
| JP | 2008147171 A | * | 6/2008 |
| JP | 2008-244460 A1 | | 10/2008 |
| JP | 2008-294314 A | | 12/2008 |
| WO | 2004/047122 A1 | | 6/2004 |
| WO | 2007/105422 A1 | | 9/2007 |

OTHER PUBLICATIONS

International Search Report, PCT Application No. PCT/JP2010/066612, dated Dec. 21, 2010, 3 pages.

Written Opinion, PCT Application No. PCT/JP2010/066612, dated Dec. 12, 2010, 5 pages.

Kimizuka N. et al., "Spinel, YbFe2O4, and Yb2Fe3O7 types of structures for compounds in the In2O3 and Sc2O3—A2O3—BO systems [A: Fe, Ga, or Al; B: Mg, Mn, Fe, Ni, Cu, or Zn] at temperatures over 1000° C.", J. Solid State Chem., 1985, vol. 60, Issue 3, pp. 382-384, in English.

Nakamura M. et al., "The phase relations in the In2O3—Ga2ZnO4—ZnO system at 1350° C.", J. Solid State Chem., 1991, vol. 93, Issue 2, pp. 298-315, in English.

Kimizuka N. et al., "Syntheses and Single-Crystal Data of Homologous Compounds, In2O3(ZnO)m (m=3, 4, and 5), InGaO3(ZnO)3, and Ga2O3(ZnO)m (m=7, 8, 9, and 16) in the In2O3—ZnGa2O4—ZnO System", J. Solid State Chem., 1995, vol. 116, Issue 1, pp. 170-178, in English.

Li C. et al., "Modulated Structures of Homologous Compounds InMO3(ZnO)m (M=In,Ga; m=Integer) Described by Four-Dimensional Superspace Group", J. Solid State Chem., 1998, vol. 139, Issue 2, pp. 347-355, in English.

Takahashi M. et al., "Theoretical Analysis of IGZO, Transparent Amorphous Oxide Semiconductor", IDW'08: Proceedings of the 15th international display workshops, Dec. 3, 2008, pp. 1637-1640, in English.

Nakamura M., "Synthesis of Homologous Compound with New Long-Period Structure", NIRIM Newsletter, Mar. 1, 1995, vol. 150, pp. 1-4, with Full English Translation.

Orita M. et al., "Mechanism of electrical conductivity of transparent InGaZnO4", Phys. Rev. B, 2000, vol. 61, No. 3, pp. 1811-1816, in English.

C. Van de Walle, "Hydrogen as a Cause of Doping in Zinc Oxide", Phys. Rev. Lett., 2000, vol. 85, No. 5, pp. 1012-1015, in English.

Orita M., "Amorphous transparent conductive oxide InGaO3(ZnO)m (m<4): a Zn 4s conductor", Philosophical Magazine B, 2001, vol. 81, No. 5, pp. 501-515, in English.

S. Lany et al., "Dopability, Intrinsic Conductivity, and Nonstoichiometry of Transparent Conducting Oxides", Phys. Rev. Lett., 2007, vol. 98, Issue 4, 045501, in English.

P. Simon et al., "Materials for electrochemical capacitors", Nat. Mater., 2008, vol. 7, Issue 11, pp. 845-854, in English.

* cited by examiner

ELECTROCHEMICAL CAPACITOR

TECHNICAL FIELD

The present invention relates to an electrochemical capacitor and a manufacturing method thereof.

BACKGROUND ART

In recent years, development of electrochemical capacitors has been conducted. As examples of electrochemical capacitors, there is an electric double layer capacitor (EDLC) which utilizes positive and negative charge that is electrostatically accumulated capacity at an interface of the electrode and electrolyte solution, and a redox capacitor which utilizes accumulated capacity with an electron transfer process (Faraday process) at a surface of the electrode (refer to Patent Document 1).

REFERENCE

[Patent Document 1] Japanese Published Patent Application No. 2007-123833

DISCLOSURE OF INVENTION

In an embodiment of the present invention, a new structure of an electrochemical capacitor and method of manufacturing the electrochemical capacitor is provided. Further, in an embodiment of the present invention, an electrochemical capacitor capable of increasing a capacity is proposed. Additionally, in an embodiment of the present invention, a method of manufacturing an electrochemical capacitor capable of improving productivity is proposed.

In an embodiment of the present invention, a positive electrode and a negative electrode formed over a surface plane of a substrate is a feature of an electrochemical capacitor. Additionally, in an embodiment of the present invention, there is an electrochemical capacitor which has an electrolyte, and a positive electrode and a negative electrode in contact with a same surface plane of the electrolyte. In other words, the electrochemical capacitor has a positive electrode active material and a negative electrode active material in contact with and over a surface plane of an electrolyte, and a positive electrode current collector in contact with the positive electrode active material and a negative electrode current collector in contact with the negative electrode active material.

When the electrochemical capacitor is a redox capacitor, an electrolyte is formed over the substrate. Alternatively, the electrolyte functions as a support. In which case, the electrolyte is formed of a proton conductor. As the proton conductor, cesium hydrogen sulfate, cesium hydrogen phosphate, silicon oxide, or an amorphous semiconductor including hydrogen is used. As the amorphous semiconductor including hydrogen, there is amorphous silicon, amorphous silicon germanium, or amorphous germanium. Alternatively, as the amorphous semiconductor including hydrogen, there is an oxide semiconductor including hydrogen, and as the oxide semiconductor including hydrogen, there is zinc oxide, titanium oxide, nickel oxide, vanadium oxide, tin oxide, or indium oxide. Furthermore, as the amorphous semiconductor including hydrogen, there is an In-M-Zn oxide semiconductor (M is selected from one or a plurality of metal elements of Al, Ga, Fe, Ni, Mn, and Co), in which a crystal of $InMO_3(ZnO)m$ ($m>0$) may be included in the amorphous structure. Further, nitrogen may be included in the In-M-Zn oxide semiconductor. By including nitrogen, the hydrogen concentration of the In-M-Zn oxide semiconductor can be increased.

In the case that the electrochemical capacitor is an electric double layer capacitor, a positive electrode and a negative electrode are formed on a surface of a substrate. Also, the substrate formed with the positive electrode and the negative electrode and an electrolyte solution are sealed by a sealing member.

According to an embodiment of the present invention, productivity of an electrochemical capacitor can be improved. Further, a capacity of an electrochemical capacitor of an embodiment of the present invention can be increased.

BEST MODE FOR CARRYING OUT THE INVENTION

Figure 1A:
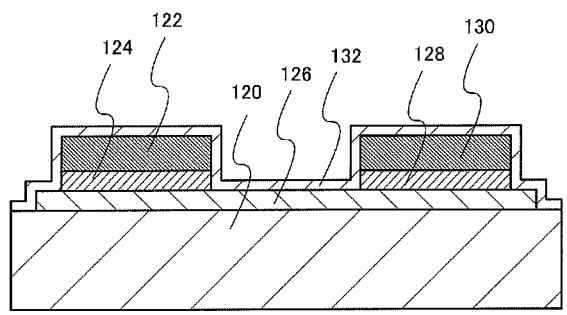
FIGS. 1A and 1B are cross-sectional views showing structures of an electrochemical capacitor.

Hereinafter, embodiments of the present invention will be described with reference to the drawings. Note that the invention is not limited to the following description, and it will be easily understood by those skilled in the art that various changes and modifications can be made without departing from the spirit and scope of the invention. Thus, the present invention should not be interpreted as being limited to the following description of the embodiments. In description with reference to the drawings, in some cases, the same reference numerals are used in common for the same portions in different drawings. Further, in some cases, the same hatching patterns are applied to similar parts and the similar parts are not necessarily designated by reference numerals.

Embodiment 1

In the present embodiment, a structure of a redox capacitor, which is a mode of an electrochemical capacitor, will be described with reference to FIGS. 1A and 1B.

FIG. 1A shows a redox capacitor having an electrolyte 126 formed over a substrate 120, a first active material 124 and a second active material 128 formed over the electrolyte 126, a first current collector 122 formed over the first active material 124, and a second current collector 130 formed over the second active material 128.

Figure 1B:
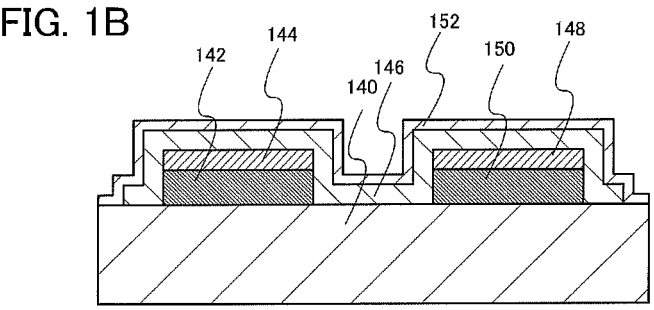

FIG. 1B shows a redox capacitor having a first current collector 142 and a second current collector 150 formed over a substrate 140, a first active material 144 formed over the first current collector 142, a second active material 148 formed over the second current collector 150, an electrolyte 146 which overlaps side surfaces of the first current collector 142 and the second current collector 150 plus a surface and side surfaces of the first active material 144 and the second active material 148.

Plastic or such ceramics as glass, quartz, and alumina can be used as the substrate 120. Note that, as the plastic, a fiberglass-reinforced plastics (FRP) plate, a polyvinyl fluoride (PVF) film, a polyester film, or an acrylic resin film can be used.

Either the first current collectors 122 and 142 or the second current collectors 130 and 150 function as the positive current collectors and the others function as the negative current collectors. The first current collectors 122 and 142 and the second current collectors 130 and 150 use an element such as aluminum, nickel, titanium, copper, gold, silver, platinum, and cobalt, or an alloy or compound thereof.

Additionally, the first current collectors 122 and 142 and the second current collectors 130 and 150 can use a conductive carbon such as an activated carbon, or a conductive polymer such as polyaniline, polythiophene, and polypyrrole.

Note that although it is not illustrated in FIGS. 1A and 1B, either the first current collectors 122 and 142 or the second current collectors 130 and 150 are connected to either positive electrode terminals or negative electrode terminals, and the others of either the first current collectors 122 and 142 or the second current collectors 130 and 150 are connected to the others of either the positive electrode terminals or the negative electrode terminals.

Either the first active materials 124 and 144 or the second active materials 128 and 148 function as positive electrode active materials and the others function as negative electrode active materials. The first active materials 124 and 144 and the second active materials 128 and 148 can use one or a plurality of ruthenium oxide, iridium oxide, cobalt oxide, manganese oxide, tungsten oxide, niobium oxide, iron oxide, and the like.

Note, in the case of using a conductive polymer such as polyaniline, polythiophene, and polypyrrole, in the first current collectors 122 and 142 and the second current collectors 130 and 150, the first active materials 124 and 144 and the second active materials 128 and 148 are not provided, and the conductive polymer functions as both the current collectors and the active materials.

The electrolytes 126 and 146 are formed of a solid proton conductor such as cesium hydrogen sulfate, cesium hydrogen phosphate, silicon oxide, or an amorphous semiconductor including hydrogen. As the amorphous semiconductor including hydrogen, there is amorphous silicon, amorphous silicon germanium, or amorphous germanium. As the amorphous semiconductor including hydrogen, there is oxide semiconductor including hydrogen, typically zinc oxide, titanium oxide, nickel oxide, vanadium oxide, tin oxide, or indium oxide. Also, as the oxide semiconductor including hydrogen, there is In-M-Zn oxide semiconductor (M is selected from one or a plurality of metal elements of Al, Ga, Fe, Ni, Mn, and Co), in which a crystal of $InMO_3(ZnO)_m$ ($m>0$) may be included in the amorphous structure. Further, nitrogen may be included in the In-M-Zn oxide semiconductor. By including nitrogen, the hydrogen concentration of the In-M-Zn oxide semiconductor can be increased.

Alternatively, other than the above-mentioned, In—Sn oxide semiconductor, In—Sn—Zn oxide semiconductor, In—Al—Zn oxide semiconductor, Sn—Ga—Zn oxide semiconductor, Al—Ga—Zn oxide semiconductor, Sn—Al—Zn oxide semiconductor, In—Zn oxide semiconductor, Sn—Zn oxide semiconductor, or Al—Zn oxide semiconductor can be employed as the oxide semiconductor including hydrogen. Moreover, silicon oxide may be included in the above described metal oxides.

Cesium hydrogen sulfate, cesium hydrogen phosphate, or the oxide semiconductor including hydrogen may be a hydrated oxide. A preferred hydration number of the hydrate differs depending on the type of metal.

Additionally, a proton conducting high molecular material can be used as the electrolytes 126 and 146. As the proton conducting high molecular material, a perfluorosufonate ion exchange resin, another ion exchange resin, or a high molecular material capable of conducting protons can be used.

Note that a protective layer 132 or a protective layer 152 may be provided around the redox capacitor. Silicon nitride, diamond like carbon (DLC), silicon oxide and the like can be used as the protective layers 132 and 152. By providing the protective layer 132 or the protective layer 152 around the redox capacitor, stable operation of the redox capacitor is possible and its deterioration can be reduced.

Figure 2A:
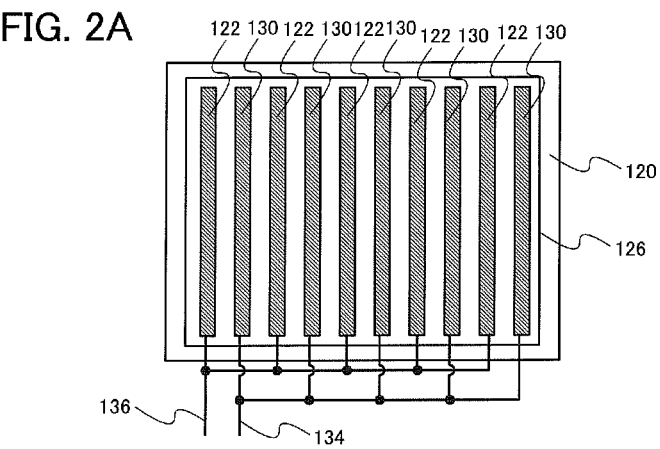
FIGS. 2A and 2B are top views showing structures of an electrochemical capacitor.
Figure 2B:
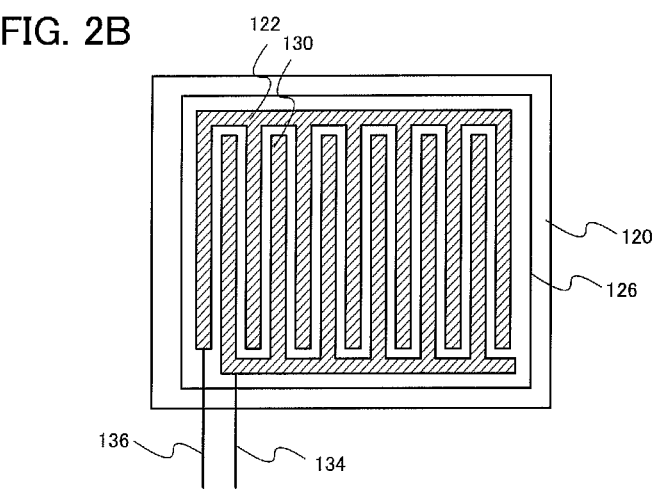

A top view of the redox capacitor shown in FIG. 1A is illustrated in FIGS. 2A and 2B.

As shown in FIG. 2A, the first current collector 122 and the second current collector 130 can be arranged in parallel. Alternatively, as shown in FIG. 2B, the first current collector 122 and the second current collector 130 can be comb-shaped. In this way, by the first current collector 122 and the second current collector 130 being parallel or comb-shaped, opposing areas of the first current collector 122 and the second current collector 130 can be enlarged, and the capacity of the redox capacitor can be increased.

Note that the first current collector 122 is connected to one of a positive electrode terminal and a negative electrode terminal 136, and the second current collector 130 is connected to the other of the positive electrode terminal and the negative electrode terminal 134. However, the method of connecting the current collector with the positive electrode terminal or the negative electrode terminal is not limited, and the combination of the current collector with the positive electrode terminal or the negative electrode terminal may be changed as appropriate.

Note that the first current collector 142 and the second current collector 150 of the redox capacitor shown in FIG. 1B can have the top surface shapes illustrated in FIGS. 2A and 2B.

Next, a manufacturing method of a redox capacitor shown in FIG. 1A will be described.

As illustrated in FIG. 1A, the electrolyte 126 is formed over the substrate 120. The electrolyte 126 is formed using such methods as a sputtering method, a CVD method, an evaporation method, a printing method, a sol-gel method, or a dip coating method.

When the electrolyte 126 is formed with cesium hydrogen sulfate or cesium hydrogen phosphate, the evaporation method, the sol-gel method, or the dip coating method may be used as appropriate.

When an amorphous semiconductor including hydrogen is formed by a sputtering method as the electrolyte 126, the amorphous semiconductor including hydrogen can be deposited over the substrate 120 by performing sputtering using a target including hydrogen, and a noble gas or a noble gas with hydrogen as a sputtering gas. Note, when using hydrogen in the sputtering gas, it is not necessary that the target includes hydrogen. Typically, by performing sputtering using a silicon target including hydrogen, a germanium target including hydrogen, or a silicon germanium target including hydrogen, with a noble gas and/or hydrogen as a sputtering gas, amorphous silicon, amorphous germanium, or amorphous silicon germanium is deposited. Alternatively, by sputtering using zinc oxide including hydrogen, titanium oxide including hydrogen, nickel oxide including hydrogen, vanadium oxide including hydrogen, tin oxide including hydrogen, indium oxide including hydrogen, or In-M-Zn oxide semiconductor including hydrogen (M is selected from one or a plurality of metal elements of Al, Ga, Fe, Ni, Mn, and Co) as the target, and a noble gas or a noble gas with hydrogen as the sputtering gas, the amorphous semiconductor including hydrogen can be deposited over the substrate 120. Note, when using hydrogen in the sputtering gas, it is not necessary that the target includes hydrogen. Additionally, reactive sputtering can be used. Typically, the amorphous semiconductor including hydrogen can be deposited over the substrate 120 by sputtering using zinc, titanium, nickel, vanadium, tin, indium, or In-M-Zn-alloy (M is selected from one or a plurality of metal elements of Ga, Fe, Ni, Mn, and Co) as the target, and using a noble gas with oxygen or a noble gas with oxygen and hydrogen as the sputtering gas.

Also, the amorphous semiconductor including hydrogen can be deposited over the substrate 120 by a CVD method using a gas including hydrogen atoms in the source gas. Typically, the amorphous semiconductor including hydrogen can be deposited over the substrate 120 by a plasma CVD method using silane, disilane, and/or germane. Note that hydrogen or hydrogen and a noble gas may be used in the source gas.

Additionally, an amorphous semiconductor is formed over the substrate 120 and then hydrogen is added to the amorphous semiconductor; thus, the amorphous semiconductor including hydrogen can be formed. Typically, the amorphous semiconductor including hydrogen can be formed by depositing the amorphous semiconductor over the substrate 120 and then performing heating in a hydrogen atmosphere. Alternatively, the amorphous semiconductor including hydrogen can be formed by depositing the amorphous semiconductor over the substrate 120, and then adding hydrogen to the amorphous semiconductor by an ion doping method or an ion implantation method.

Next, the first active material 124 and the second active material 128 are formed over the electrolyte 126. The first active material 124 and the second active material 128 are formed using a method such as a sputtering method, an evaporation method, a printing method, and an inkjet method.

Then, the first current collector 122 and the second current collector 130 are formed over the first active material 124 and the second active material 128, respectively. The first current collector 122 and the second current collector 130 are formed using a method such as a sputtering method, an evaporation method, a printing method, and an inkjet method.

The first current collector 122 and the second current collector 130 of the redox capacitor described in the present embodiment, can be formed at the same time. Additionally, it is possible to form the first active material 124 and the second active material 128 at the same time. For this reason, the number of process steps can be reduced.

After that, the protective layer 132 may be formed by a method such as a CVD method or a sputtering method. Also, an adhesive sheet may be attached.

By the above process, the redox capacitor illustrated in FIG. 1A can be manufactured.

For the redox capacitor illustrated in FIG. 1B, the first current collector 142 and the second current collector 150 are formed over the substrate 140. Next, the first active material 144 and the second active material 148 are formed over the first current collector 142 and the second current collector 150, respectively. Then, the electrolyte 146 is formed. A protective layer 152 is then formed. The manufacturing methods thereof being similar to those of the first current collector 122 and the second current collector 130, the first active material 124 and the second active material 128, the electrolyte 126, and the protective layer 132, respectively, which are illustrated in FIG. 1A.

In the present embodiment, since it is possible to manufacture the redox capacitor using semiconductor manufacturing equipment, productivity can be improved. Additionally, since a mode of the redox capacitor described in the present embodiment has a structure in which the electrolyte overlaps the current collector, a contact area of the current collector and the electrolyte can be increased. As a result, a capacity of the redox capacitor can be increased.

Embodiment 2

In the present embodiment, a redox capacitor which is capable of an increased capacity greater than that of Embodiment 1 will be described with reference to FIGS. 3A and 3B. A feature of the redox capacitor described in this embodiment is that it has a concave-convex shaped current collector or a concave-convex shaped electrolyte formed over a substrate.

Figure 3A:
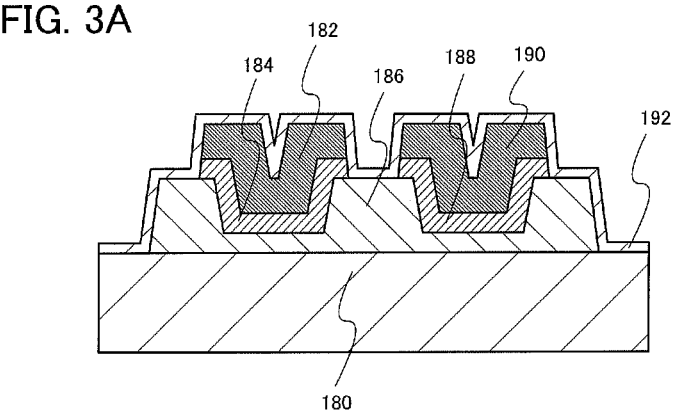
FIGS. 3A and 3B are cross-sectional views showing structures of an electrochemical capacitor.

FIG. 3A shows a redox capacitor having a concave-convex shaped electrolyte 186 formed over a substrate 180, a first active material 184 and a second active material 188 formed over the electrolyte 186, a first current collector 182 formed over the first active material 184, and a second current collector 190 formed over the second active material 188.

Figure 3B:
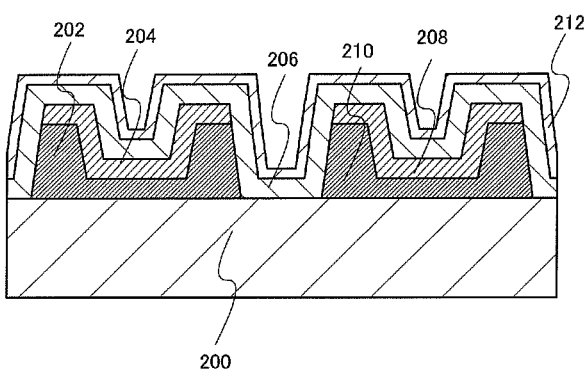

FIG. 3B shows a redox capacitor having a concave-convex shaped first current collector 202 and a concave-convex shaped second current collector 210 formed over a substrate 200, a first active material 204 formed over the first current collector 202, a second active material 208 formed over the second current collector 210, an electrolyte 206 which overlaps side surfaces of the first current collector 202 and the second current collector 210 plus a surface and side surfaces of the first active material 204 and the second active material 208.

The first current collectors 182 and 202 and the second current collectors 190 and 210 can be formed of a material similar to that of the first current collectors 122 and 142 and the second current collectors 130 and 150, described in Embodiment 1, respectively.

The first active materials 184 and 204 and the second active materials 188 and 208 can be formed of a material similar to that of the first active materials 124 and 144 and the second active materials 128 and 148, described in Embodiment 1, respectively.

The first current collectors 182 and 202 and the second current collectors 190 and 210 of the redox capacitor described in the present embodiment can be formed at the same time. Also, it is possible to form the first active materials 184 and 204 and the second active materials 188 and 208 at the same time. For this reason, the number of process steps can be reduced.

The similar material to that of the electrolytes 126 and 146 described in Embodiment 1 can be used for the electrolytes 186 and 206.

The concave-convex shaped electrolyte 186 shown in FIG. 3A, the concave-convex shaped first current collector 202 and the second current collector 210 shown in FIG. 3B, can be formed by forming a thin film over a substrate, forming a concave-convex shaped resist mask by a photolithography process over the thin film, then anisotropically etching the thin film over the substrate using the aforesaid resist mask. Note that the concave-convex shaped resist mask can be formed by a photolithography process using a half-tone mask or gray-tone mask. Further, the concave-convex resist mask can be formed by reduced projection exposure with a stepper.

Note that a protective layer 192 or a protective layer 212 may be provided around the redox capacitor. The similar materials for the protective layer 132 described in Embodiment 1 can be used for the protective layers 192 and 212.

By forming the current collector of a concave-convex shape over the substrate, a contact area of the active material and the electrolyte stacked thereover is increased. Moreover, by forming the electrolyte of a concave-convex shape over the substrate, a contact area of the electrolyte and the active material formed thereover is increased. For these reasons, a capacity of the redox capacitor can be increased.

In the present embodiment, since it is possible to manufacture the redox capacitor using semiconductor manufacturing equipment, productivity can be improved. Additionally, since the redox capacitor described in the present embodiment has a structure in which the electrolyte covers the current collector, a contact area of the current collector and the electrolyte can be increased. As a result, a capacity of the redox capacitor can be increased.

Embodiment 3

In the present embodiment, a redox capacitor which has a different structure from that of Embodiment 1 and Embodiment 2 will be described with reference to FIG. 4.

Figure 4:
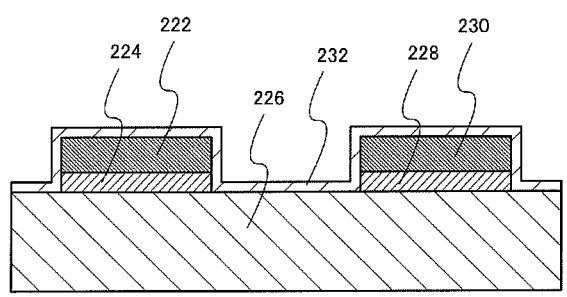
FIG. 4 is a cross-sectional view showing a structure of an electrochemical capacitor.

FIG. 4 shows a redox capacitor having an electrolyte 226, a first active material 224 and a second active material 228 formed over the electrolyte 226, a first current collector 222 formed over the first active material 224, and a second current collector 230 formed over the second active material 228.

In the present embodiment, the electrolyte 226 acts as a support of the redox capacitor. Typically, a pellet of cesium hydrogen sulfate, cesium hydrogen phosphate, or an oxide semiconductor including hydrogen is used as the electrolyte 226.

Next, a manufacturing method of a redox capacitor shown in this embodiment will be described.

A powder which becomes a material of the electrolyte 226 is ground, and the particle size of the powder is reduced. Then, after the ground powder is put in a pellet forming device, a pellet is formed by applying pressure.

Next, the first active material 224 and the second active material 228, and the first current collector 222 and the second current collector 230 are formed over the pellet. Then, a protective layer 232 is formed so as to cover the first active material 224 and the second active material 228, plus the first current collector 222 and the second current collector 230. The first active material 224 and the second active material 228 can be formed in a manner similar to that of the first active material 124 and the second active material 128 described in Embodiment 1. Further, the first current collector 222 and the second current collector 230 can be formed in a manner similar to that of the first current collector 122 and the second current collector 130 described in Embodiment 1. Moreover, the materials similar to that of the protective layer 132 described in Embodiment 1 may be used for the protective layer 232. Additionally, a sheet shaped or board shaped first current collector 222 and second current collector 230 is formed, and after coating a mixture including a powder which is a source material for the first active material 224 and the second active material 228 on one surface of the first current collector 222 and the second current collector 230, respectively, the first current collector 222 and the second current collector 230 may be pressed into the pellet so that the mixture is in contact with the pellet. Then, the mixture may be dried by heating.

In the present embodiment, since the electrolyte acts as the support for the redox capacitor, a separate substrate is not required; therefore, cost reduction is possible.

Embodiment 4

A sealing structure of the redox capacitor described in Embodiment 1 to Embodiment 3 will be described with reference to FIGS. 5A and 5B. In the present embodiment, a redox capacitor described in Embodiment 1 will be used for explanation.

Figure 5A:
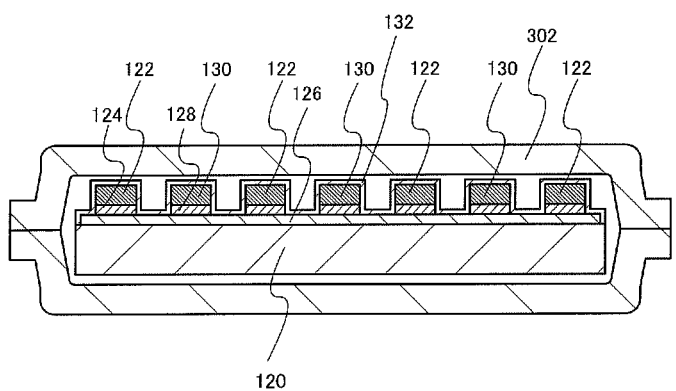
FIGS. 5A and 5B are cross-sectional views showing structures of an electrochemical capacitor.

As shown in FIG. 5A, the redox capacitor is sealed by the sealing member 302. In this case, although not illustrated, an external terminal connected to the first current collector 122 and an external terminal connected to the second current collector 130, project out of the sealing member 302. Note that an internal portion of the sealing member 302 may be subjected to reduced pressure. Furthermore, the internal portion of the sealing member 302 may be filled with an inert gas. As the sealing member 302, a laminate film, a metal sealant can or the like may be used. Also, in FIG. 5A, a plurality of substrates provided with the redox capacitors are stacked, and each redox capacitor may be connected in series or in parallel.

Figure 5B:
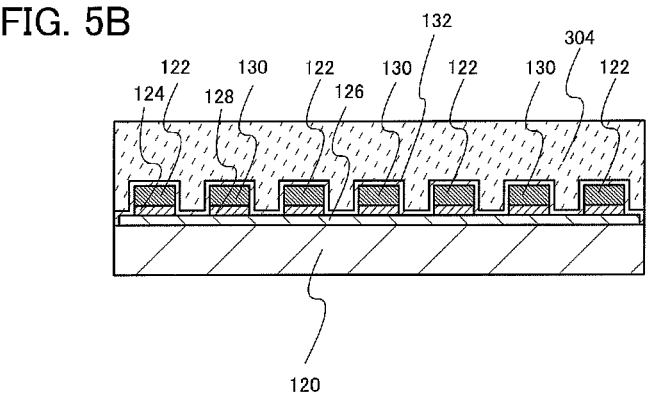

Also, as shown in FIG. 5B, the redox capacitor can be sealed by an organic resin 304. In this case, although not illustrated, an external terminal connected to the first current collector 122 and an external terminal connected to the second current collector 130, project out of the organic resin 304. Since the electrolyte of the redox capacitor described in Embodiment 1 to Embodiment 3 is solid, it can be easily sealed by the organic resin 304. Note that in FIG. 5B, a plurality of substrates provided with the redox capacitors are stacked, and each redox capacitor is connected in series or in parallel and may be sealed by the organic resin 304.

By connecting different redox capacitors formed over the substrate in series, a charge and discharge voltage can be increased. Also, by connecting the different redox capacitors formed over the substrate in parallel, a capacitance can be increased.

Embodiment 5

In the present embodiment, an electric double layer capacitor, which is one embodiment of the electrochemical capacitor, will be described with reference to FIG. 6.

Figure 6:
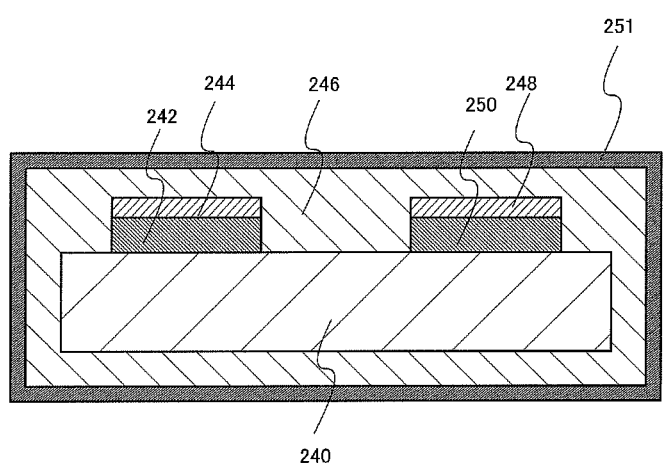
FIG. 6 is a cross-sectional view showing a structure of an electrochemical capacitor.

The electric double layer capacitor shown in FIG. 6 includes a first current collector 242 and a second current collector 250 formed over a substrate 240, a first active material 244 and a second active material 248 formed over the first current collector 242 and the second current collector 250, respectively, and an electrolyte solution 246, which are sealed within a sealing member 251.

The similar materials to that of the substrate 120 or 140 described in Embodiment 1 can be used for the substrate 240. Also, a cellulose porous material such as a nonwoven fabric or porous film of a polyolefin based resin material can be used as the substrate 240.

The first current collector 242 and the second current collector 250 can be formed using, for example, stainless steel or aluminum.

The first active material 244 and the second active material 248 can be formed using a carbon material, a conductive material, and a binder. As the carbon material, coconut shell activated carbon, phenol activated carbon or the like can be used. As the conductive material, acetylene black, furnace black, carbon black, or graphite can be used. As the binder, polytetrafluoroethylene, vinylidene fluoride copolymer or the like can be used.

An aqueous-based electrolyte solution of a sulfuric acid aqueous solution or a hydrochloric acid aqueous solution can be used for the electrolyte solution 246. Alternatively, a non-aqueous electrolyte solution of ammonium salt or phosphonium salt dissolved in a propylene carbonate solvent may be used.

A laminate film of aluminum sandwiched by an organic resin can be used for the sealing member 251, but is not limited thereto, and other types of laminate film can be used appropriately.

Note that the first current collector 242 and the second current collector 250 formed over the substrate 240, and the first active material 244 and the second active material 248 are formed over the first current collector 242 and the second current collector 250, respectively, for the electric double layer capacitor illustrated in FIG. 6. However, the electric double layer capacitor may be formed with the first active material 244 and the second active material 248 formed over the substrate 240, and the first current collector 242 and the second current collector 250 formed over the first active material 244 and the second active material 248, respectively.

Next, a manufacturing method for the electric double layer capacitor illustrated in FIG. 6 is described.

The first current collector 242 and the second current collector 250 are formed over the substrate 240. The first current collector 242 and the second current collector 250 can be manufactured in the manner similar to that of the first current collector 122 and the second current collector 130 described in Embodiment 1.

Next, over the first current collector 242 and the second current collector 250, the first active material 244 and the second active material 248 are formed of a mixture in which a carbon material, a conductive material, and a binder are mixed with a solvent. Then, after the mixture is printed over the first current collector 242 and the second current collector 250, drying is performed. Printing and drying of the mixture may be repeated a plurality of times.

Next, the substrate 240 which is formed with the first current collector 242 and the second current collector 250, plus the first active material 244 and the second active material 248, is set in the sealing member 251, and an electrolyte solution is injected into the sealing member 251. After that, the sealing member is sealed under reduced pressure.

The electric double layer capacitor can be manufactured by the above steps. Since an electric double layer capacitor described in the present embodiment has a structure in which the electrolyte covers the current collector, a contact area of the current collector and the electrolyte can be increased. For this reason, a capacity of the electric double layer capacitor can be increased.

Example 1

In this example, a manufacturing method of a redox capacitor using an In—Ga—Zn oxide semiconductor including hydrogen for an electrolyte is described, and the electric characteristics of the redox capacitor measured by cyclic voltammetry (CV) are illustrated.

For the electrolyte, an In—Ga—Zn oxide semiconductor including hydrogen is formed with a thickness of 100 nm by a sputtering method over a glass substrate. The deposition method at this time is described next. The composition of In:Ga:Zn as the target is equal to 1:1:0.5, the sputtering gas is 30 sccm of Ar and 15 sccm of $O_2$, the pressure is 0.4 Pa, the power supply is 0.5 kW, the distance between electrodes is 60 mm, and the film formation temperature is of room temperature. When a composition of the deposited stack In—Ga—Zn oxide semiconductor over a glass substrate was analyzed by an electron probe X-ray microanalyzer (EPMA), the atom ratio of O:Ga:In:Zn was equal to 61.3:15.8:16.8:6. Additionally, a hydrogen concentration was $7 \times 10^{20}$ atoms/cm$^3$ according to a secondary ion mass spectrometry (SIMS).

Next, two carbon boards with a thickness of 0.5 mm, a width of 10 mm, and a length of 63 mm are prepared as the current collectors, and after a mixture including ruthenium oxide is coated to the carbon boards, the surface to which the mixture including ruthenium oxide was coated is pressed into the electrolyte. At this time, the distance between the two carbon boards is 1 mm. Further, the ruthenium oxide mixture, which is a mixture of 0.05 g of ruthenium oxide and 1 ml of water, at this time, is used.

Then, to maintain insulation between the two carbon boards, an insulative tape which is adhesive is pressure bonded to the exposed In—Ga—Zn oxide semiconductor, and the redox capacitor is manufactured.

Next, the electric characteristics of the redox capacitor were measured by cyclic voltammetry. The measurement conditions at the time were a charge discharge voltage of 0V to 1V, a scanning speed of 100 mV/s, a cycle number of five times, and a measurement interval of 100 ms. The cyclic voltammogram is illustrated in FIG. 7.

Figure 7:
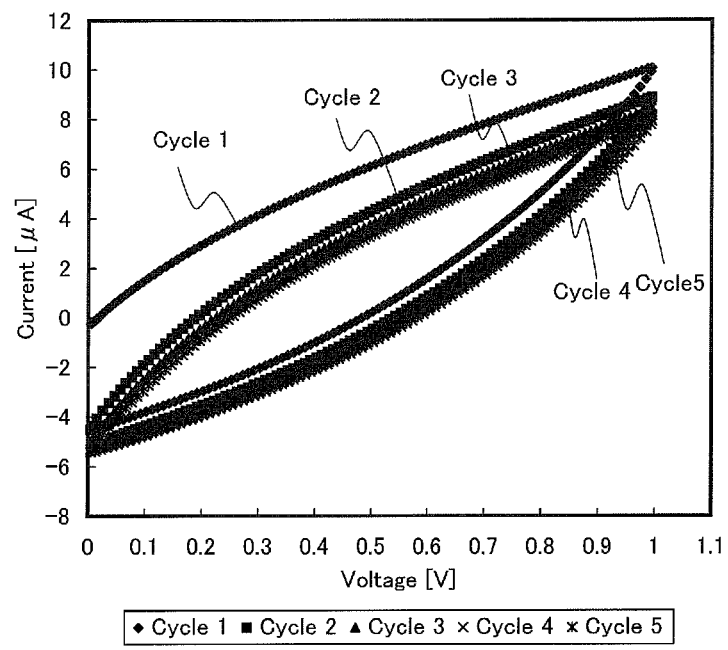
FIG. 7 is a graph showing a cyclic voltammogram of an electrochemical capacitor.

From FIG. 7, it is understood that the redox capacitor using In—Ga—Zn oxide semiconductor for the electrolyte can be manufactured.

This application is based on Japanese Patent Application serial no. 2009-227004 filed with Japan Patent Office on Sep. 30, 2009, the entire contents of which are hereby incorporated by reference.

REFERENCE NUMERALS

100: substrate, 112: protective layer, 120: substrate, 122: current collector, 124: active material, 126: electrolyte, 128: active material, 130: current collector, 132: protective layer, 134: positive electrode terminal or negative electrode terminal, 136: positive electrode terminal or negative electrode terminal, 140: substrate, 142: current collector, 144: active material, 146: electrolyte, 148: active material, 150: current collector, 152: protective layer, 180: substrate, 182: current collector, 184: active material, 186, electrolyte, 188, active material, 190: current collector, 192: protective layer, 200: substrate, 202: current collector, 204: active material, 206: electrolyte, 208: active material, 210: current collector, 222: current collector, 224: active material, 226: electrolyte, 228: active material, 230: current collector, 232: protective layer, 240: substrate, 242: current collector, 244: active material, 246: electrolyte solution, 248: active material, 250: current collector, 251: sealing member, 302: sealing member, 304: organic resin.

The invention claimed is:
1. An electrochemical capacitor comprising:
a substrate;
an solid electrolyte over the substrate; and
a positive electrode and a negative electrode over the solid electrolyte,
wherein the solid electrolyte is in contact with the substrate between the positive electrode and the negative electrode.
2. The electrochemical capacitor according to claim 1, wherein the positive electrode comprises an active material in contact with the solid electrolyte and a current collector in contact with the active material.

3. The electrochemical capacitor according to claim 1, wherein the negative electrode comprises an active material in contact with the solid electrolyte and a current collector in contact with the active material.

4. The electrochemical capacitor according to claim 1, wherein the solid electrolyte includes cesium hydrogen sulfate or cesium hydrogen phosphate.

5. The electrochemical capacitor according to claim 1, wherein the solid electrolyte includes silicon oxide.

6. The electrochemical capacitor according to claim 1, wherein the solid electrolyte is an amorphous semiconductor including hydrogen.

7. The electrochemical capacitor according to claim 6, wherein the amorphous semiconductor including hydrogen is amorphous silicon, amorphous silicon germanium, or amorphous germanium.

8. The electrochemical capacitor according to claim 6, wherein the amorphous semiconductor including hydrogen is an oxide semiconductor including hydrogen.

9. The electrochemical capacitor according to claim 8, wherein the oxide semiconductor including hydrogen is zinc oxide, titanium oxide, nickel oxide, vanadium oxide, tin oxide, or indium oxide.

10. The electrochemical capacitor according to claim 6, wherein the amorphous semiconductor including hydrogen is In-M-Zn oxide semiconductor (M is selected from one or a plurality of metal elements of Al, Ga, Fe, Ni, Mn, and Co).

11. An electrochemical capacitor comprising:
a substrate;
a solid electrolyte comprising a first portion, a second portion, and a third portion over the substrate; and
a positive electrode over the first portion, and a negative electrode over the second portion,
wherein a thickness of the solid electrolyte at the first portion and a thickness of the solid electrolyte at the second portion are different from a thickness of the solid electrolyte at the third portion, and
wherein a sealing member seals the substrate and the solid electrolyte.

12. The electrochemical capacitor according to claim 11, wherein the positive electrode comprises an active material in contact with the solid electrolyte and a current collector in contact with the active material.

13. The electrochemical capacitor according to claim 11, wherein the negative electrode comprises an active material in contact with the solid electrolyte and a current collector in contact with the active material.

14. The electrochemical capacitor according to claim 11, wherein the solid electrolyte includes indium, zinc and oxygen.

15. The electrochemical capacitor according to claim 11, wherein the sealing member includes a laminate film of aluminum sandwiched by an organic resin.

16. The electrochemical capacitor according to claim 11, wherein the solid electrolyte is in contact with the substrate between the positive electrode and the negative electrode.

17. The electrochemical capacitor according to claim 11, wherein an internal portion of the sealing member is subjected to reduced pressure.

18. The electrochemical capacitor according to claim 11, wherein an internal portion of the sealing member is filled with an inert gas.

* * * * *

UNITED STATES PATENT AND TRADEMARK OFFICE
CERTIFICATE OF CORRECTION

| | | |
|---|---|---|
| PATENT NO. | : 8,755,169 B2 | |
| APPLICATION NO. | : 12/891321 | |
| DATED | : June 17, 2014 | |
| INVENTOR(S) | : Kazutaka Kuriki, Kiyofumi Ogino and Yumiko Saito | |

It is certified that error appears in the above-identified patent and that said Letters Patent is hereby corrected as shown below:

In the Specification

Column 4, line 7, replace "perfluorosufonate" with --perfluorosulfonate--; and

In the Claims

Column 10, line 60, in claim 1, replace "an" with --a--.

Signed and Sealed this
Twenty-fourth Day of February, 2015

Michelle K. Lee
*Deputy Director of the United States Patent and Trademark Office*